United States Patent
Murai et al.

(10) Patent No.: US 7,702,171 B2
(45) Date of Patent: Apr. 20, 2010

(54) SCREEN DATA TRANSMITTING DEVICE

(75) Inventors: Shinya Murai, Yokohama (JP); Shogo Yamaguchi, Kawasaki (JP); Hajime Yamaguchi, Yokohama (JP); Toshio Shirakihara, Yokohama (JP); Haruhiko Toyama, Kawasaki (JP); Takuya Kawamura, Kawasaki (JP)

(73) Assignee: Kabushiki Kasha Toshiba, Tokyo (JP)

( * ) Notice: Subject to any disclaimer, the term of this patent is extended or adjusted under 35 U.S.C. 154(b) by 1010 days.

(21) Appl. No.: 11/389,136

(22) Filed: Mar. 27, 2006

(65) Prior Publication Data

US 2006/0222246 A1    Oct. 5, 2006

(30) Foreign Application Priority Data

Mar. 31, 2005   (JP)   ............................. 2005-100307

(51) Int. Cl.
  *G06K 9/00* (2006.01)
  *G06K 9/34* (2006.01)
  *G06K 9/36* (2006.01)
  *G06K 9/46* (2006.01)
  *G06F 3/00* (2006.01)

(52) U.S. Cl. ................. 382/243; 382/164; 382/173; 382/180; 382/232; 715/700

(58) Field of Classification Search ................. 382/232, 382/243, 164, 173, 180; 715/700
See application file for complete search history.

(56) References Cited

U.S. PATENT DOCUMENTS

| | | | | |
|---|---|---|---|---|
| 5,638,498 A | * | 6/1997 | Tyler et al. | ................ 358/1.18 |
| 5,949,968 A | * | 9/1999 | Gentile | ................ 358/1.16 |
| 7,360,230 B1 | * | 4/2008 | Paz et al. | ................ 725/47 |
| 2002/0030843 A1 | * | 3/2002 | Tuli | ................ 358/1.15 |
| 2003/0017846 A1 | * | 1/2003 | Estevez et al. | ................ 455/556 |
| 2004/0042506 A1 | * | 3/2004 | Fallon et al. | ................ 370/521 |
| 2004/0095601 A1 | * | 5/2004 | Ozawa | ................ 358/1.15 |
| 2004/0184664 A1 | * | 9/2004 | Tuli | ................ 382/232 |

FOREIGN PATENT DOCUMENTS

| | | | |
|---|---|---|---|
| JP | 10-126773 | | 5/1998 |
| JP | 2003-299049 | | 10/2003 |
| JP | 2003299049 A | * | 10/2003 |
| JP | 2004-86550 | | 3/2004 |

OTHER PUBLICATIONS

U.S. Appl. No. 11/367,341, filed Mar. 6, 2006, Murai et al.

* cited by examiner

*Primary Examiner*—Bhavesh M Mehta
*Assistant Examiner*—Bernard Krasnic
(74) *Attorney, Agent, or Firm*—Oblon, Spivak, McClelland, Maier & Neustadt, L.L.P.

(57) ABSTRACT

A screen data transmitting device for transmitting screen data to a screen display terminal through a network. A generation device generates a display image data. A storage device stores compression properties information associating a plurality of compression schemes with a plurality of classes of graphical user interface (GUI) components. A selection device selects one of the compression schemes with respect to a GUI component that is present in a region of the display image data. A compression device compresses the region of the display image data according to the selected compression scheme. Then, a transmission device transmits the screen data including the compressed display image data to the screen display terminal.

14 Claims, 8 Drawing Sheets

| GUI class | Properties of image to be displayed | Compression scheme |
|---|---|---|
| Text input region | Background is white<br>Character is black | Run length |
| Menu region | Background is of blue gradation<br>Character is black | Run length |
| Title bar region | Background is of blue gradation<br>Character is white | Run length |
| Desktop background | Natural image | JPEG |
| List view region | Background is white<br>Large icon is displayed | JPEG |

| GUI class | Average compression ratio | | |
|---|---|---|---|
| | JPEG | GIF | Run length |
| Text input region | 10% | 5% | 2% |
| Menu region | 10% | 5% | 15% |
| Title bar region | 5% | 10% | 15% |
| Desktop background | 5% | 20% | 50% |
| Tree view region | 10% | 5% | 5% |

| Compression processing time (average) per unit | | |
|---|---|---|
| JPEG | GIF | Run length |
| 100msec | 150msec | 20msec |

SCREEN DATA TRANSMITTING DEVICE

CROSS-REFERENCE TO RELATED APPLICATIONS

This application is based upon and claims the benefit of priority from prior Japanese Patent Application No. 2005-100307, filed Mar. 31, 2005, the entire contents of which are incorporated herein by reference.

BACKGROUND OF THE INVENTION

1. Field of the Invention

The present invention relates to a screen data transmitting device for compressing image data to be displayed on a screen of a computer and transmitting it via a network to any other information appliances.

2. Description of the Related Art

Virtual network computing (VNC) system has been used widely which transmits in real time, through a network, image data to be displayed on a screen of a personal computer (PC) so that the image data may be displayed on a remote screen display terminal and remotely manipulated from the PC. Further, such a system has also been used widely which transmits in real time such image data as data of a moving image to be displayed on a PC screen to a screen display terminal, for example, a projector by using a wireless LAN such as IEEE802.11b or IEEE802.11g so that the data may be displayed there.

Both of these systems are based on a technology for acquiring and compressing a PC image in real time and transmitting it to any other information appliances via a network. Conventionally, such real time transmission of screen image data has involves periodic acquisition and compression of image data of an entire screen or acquisition and compression of image data of only a changed portion of a screen. The image data has been compressed either by a one-time compression scheme or by such a scheme as described in Jpn. Pat. Appln. KOKAI Publication No. 10-126773 for attempting to compress image data a plurality of number of times for each frame and employing a higher compression ratio.

Jpn. Pat. Appln. KOKAI Publication No. 2004-86550 is also available which divides a screen into regions that respectively correspond to a plurality of application programs for drawing images so that a compression scheme may be set to each of the regions.

On a display screen of a PC etc., a variety of types of images are mixed such as a natural image, a character image, and a CG image. For example, in a case where only such a compression scheme as used in the JPEG standards is used for cutting off a high-frequency component of an image, a natural image can be compressed at a high compression ratio but a character image in a monochromatic background cannot be compressed at a high compression ratio in condition where its high image quality is maintained, as compared to the case of run length coding. Conversely, in the case of using only run length coding, a character image in a monochromatic background can be compressed distortion-free at a high compression ratio but a natural image with finely changing colors cannot be compressed at high ratios. Therefore, it is difficult to always obtain a high compression ratio using a single compression scheme.

Further, a compressed image data display region for which one of recent application programs is held responsible includes a plurality of components such as a character, a natural image, and an icon, which contain images having different properties in many cases.

Conventionally, the method for employing only one compression always and the method for setting a compression scheme for each of application programs have suffered from a problem that a high compression ratio cannot be obtained because an appropriate compression scheme cannot be set in such a manner as to accommodate properties of each of regions of a screen.

Further, as described in Jpn. Pat. Appln. KOKAI Publication No. 10-126773, according to a method for comparing a plurality of compression schemes always, it is possible to select and utilize an appropriate one of the compression schemes according to properties of an image to enhance a compression ratio but, to determine any one of the compression schemes, it is necessary to compress a transmit image by a plurality of the compression schemes, thus resulting in a problem of taking much of time in compression processing or requiring a dedicated processing apparatus.

On the other hand, such a method as described in Jpn. Pat. Appln. KOKAI Publication No. 2004-86550 for setting a compression scheme for each application program finds it difficult to select an appropriate one of the schemes because a display region correlated with one of the application programs includes images with different properties in many cases. Moreover, even with the same application, a design or contents to be displayed vary with user settings and operating condition, thus resulting in a problem that compression cannot always be performed properly with a compression scheme correlated fixedly.

BRIEF SUMMARY OF THE INVENTION

An aspect of the present invention is directed to a screen data transmitting device for transmitting screen data to a screen display terminal through a network. A generation device generates a display image data. A storage device stores compression properties information associating a plurality of compression schemes with a plurality of classes of graphical user interface (GUI) components. A selection device selects one of the compression schemes with respect to a GUI component that is present in a region of the display image data. A compression device compresses the region of the display image data according to the selected compression scheme. Then, a transmission device transmits the screen data including the compressed display image data to the screen display terminal.

BRIEF DESCRIPTION OF THE SEVERAL VIEWS OF THE DRAWING

FIG. 4 shows one example of information stored in a compression-properties information storage section;

FIG. 5 shows another example of the information stored in the compression-properties information storage section;

FIG. 6 shows a further example of the information stored in the compression-properties information storage section;

DETAILED DESCRIPTION OF THE INVENTION

The following will describe embodiments of the present invention with reference to drawings.

Figure 1:
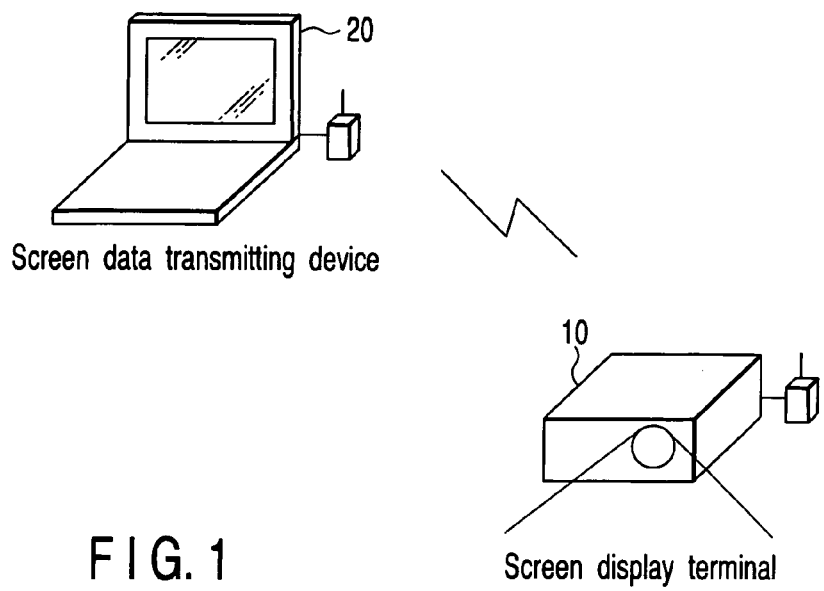
FIG. 1 is an external view of one example of a screen data transmitting device and a screen display terminal according to a first embodiment of the present invention.

FIG. 1 is an external view of one example of a screen data transmitting device and a screen display terminal according to a first embodiment of the present invention. The screen data transmitting device 20 shown in FIG. 1 generates image data of a desired screen to be displayed, compresses it, and transmits it to the screen display terminal 10 where it is displayed. The screen display terminal 10 generates display image data from the received compressed data and displays it. The screen data transmitting device 20 and the screen display terminal 10 are connected to each other through a network such as a wireless LAN. The screen data transmitting device 20 has functions to generate and display image data, specifically coming in a PC or a PDA, for example.

The screen display terminal 10 displays image data transmitted from the screen data transmitting device 20. If this transmission image data, which could be displayed on the entire screen, is to be displayed together with range information indicating coordinates or a range to be displayed on the screen, it has a function to display this image data in a display range that corresponds to this range information. The screen display terminal 10 can be used as far as it is equipped with a display section such as a CRT or an LCD and has a function to display image data on a screen, specifically coming in a TV, a PC, a PDA, a projector, etc. capable of receiving the image data from a network. It is to be noted that the screen display terminal 10 is shown as a projector.

Figure 2:
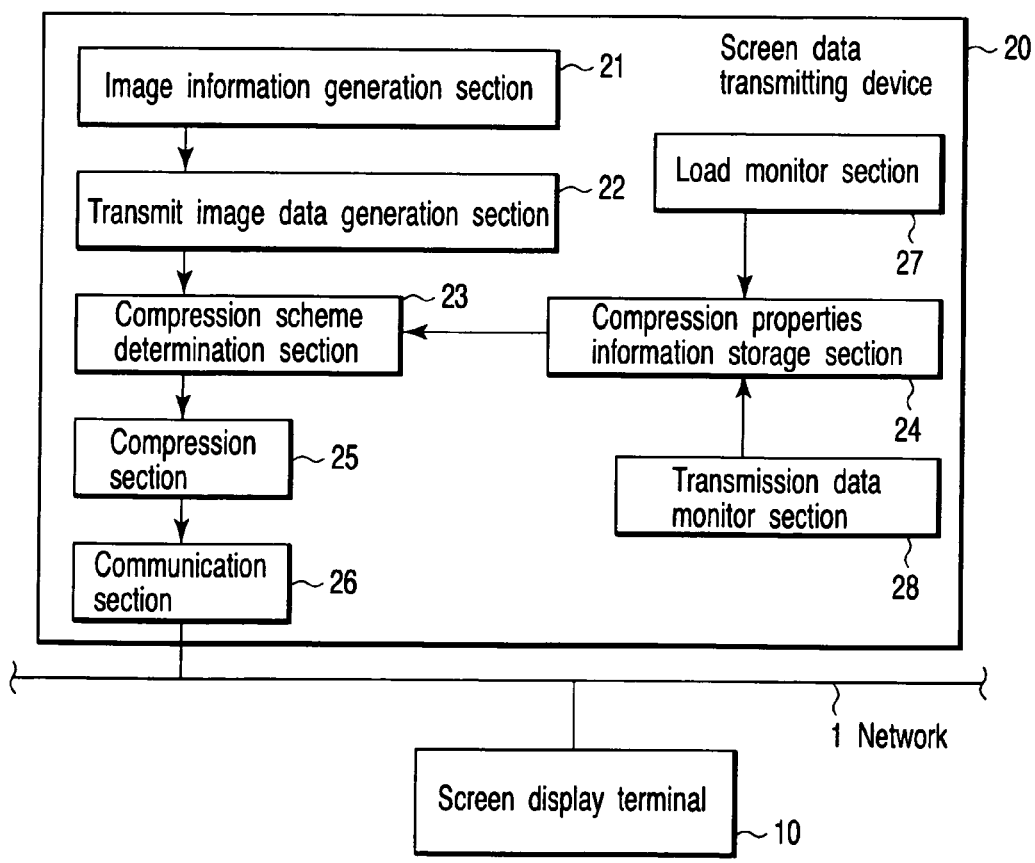
FIG. 2 is a block diagram of the one example of the screen data transmitting device and the screen display terminal according to the first embodiment of the invention.

Next, a configuration of the screen data transmitting device 20 is described with reference to FIG. 2. FIG. 2 is a block diagram of the one example of the screen data transmitting device and the screen display terminal according to the first embodiment of the present invention. In the screen data transmitting device 20 shown in FIG. 2, first a screen information generation section 21 generates information of a screen to be displayed according to a drawing instruction. If the screen data transmitting device 20 is a PC in which an application operates on the operating system (OS), typically, when the application program issues a drawing instruction to the OS, the OS generates display image data and writes it into a frame buffer for display, a series of which steps are performed by the screen information generation section 21.

Next, a transmit image data generation section 22 acquires display image data generated by the screen information generation section 21, to generate image data to be transmitted to the screen display terminal 10. For example, in the case of a PC having the above-described configuration, there may be the following possible methods: a method for the OS of the screen data transmitting device 20 hooking image data provided for display (see FIG. 7), a method for acquiring a changed region of a screen from the OS and separately obtaining data of an image in this region (see FIG. 8), a method for utilizing an external device to thereby generate transmit image data from a display video signal (see FIG. 9), and a method for acquiring, at a predetermined interval, all of data of a screen displayed and comparing it to immediately previously acquired screen data to extract changed image data (not shown). Specific examples of these methods are described in detail with reference to FIGS. 7 to 9. The thus obtained transmit image data contains data of an image and information of a position of this image in the entire screen.

A compression scheme determination section 23 determines which class of a component of a graphical user interface (GUI) a region that transmit image data generated by the transmit image generation section 21 occupies in the entire screen belongs to (step S3). The GUI component refers to, for example, a button, a scroll bar, a window title bar, a desktop background, a menu, a text input portion, a list view, etc. To determine which class of a GUI component a region occupied by transmit image data belongs to, such a possible method may be available for, for example, acquiring location information of regions for GUI components being displayed, to determine which class of GUI component the region occupied by the transmission data belongs to, from this region information.

Then, the compression scheme determination section 23 selects, on the basis of information stored in a compression properties information storage section 24, a compression scheme (compression properties information) in accordance with a class that is determined. Examples of the information stored in the compression properties information storage section 24 are shown in FIGS. 4 to 6.

A compression section 25 compresses transmission data by using a compression scheme determined by the compression scheme determination section 23 and outputs compressed data. A communication section 26 transmits the compressed data output from the compression section 26, to the screen display terminal 10 via a network 1.

Further, a load monitor section 27 monitors a load on a CPU of the screen data transmitting device 20. If the load is determined to be light by the load monitor section 27, the compression properties information storage section 24 updates the information stored in itself. A transmission data monitor section 28 monitors a quantity of image data to be transmitted to the screen display terminal 10 by the communication section 26. If the quantity of transmission data to be transmitted is determined to be not more than a preset threshold value by the transmission data monitor section 28, the information in the compression properties information storage section 24 is updated. Alternatively, the information in the compression properties information storage section 24 may be updated each time image data is transmitted.

Although an examples has been described above in which a compression ratio or a compression processing time are stored as information to be stored in the compression properties information storage section 24, only a compression scheme/parameter most suitable for each GUI component may be stored in the compression properties information storage section 24. In this case, a time required in selection of a compression scheme can be reduced.

Another method of the compression scheme determination section 23 deciding which GUI component a region of transmit image data belongs may comprise steps of always reserving regions of an entire screen that are occupied by GUI components and deciding, based on this information, which one of the GUI components the region occupied by transmission data belongs to. In such a manner, a time required in selection of a compression scheme can be reduced.

Further, information on which screen regions are suitable for which compression schemes may be maintained always based on information stored in the compression properties information storage section 24. In such a manner, a time required in selection of a compression scheme can be reduced when screen image data is transmitted.

Figure 3:
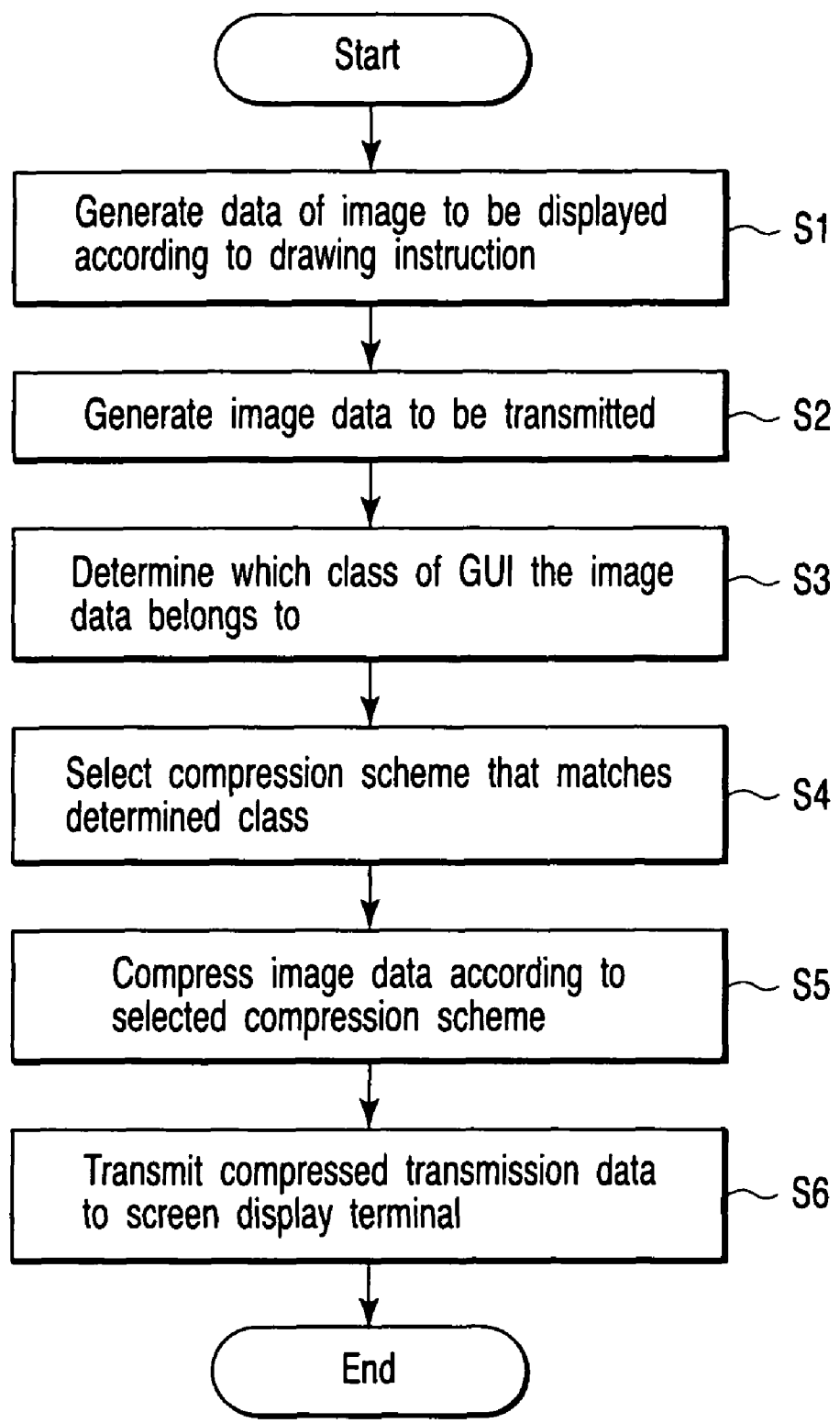
FIG. 3 is a flowchart of screen data transmitting processing.

Next, processing by the image transmitting set 20 shown in FIG. 2 is described. FIG. 3 is a flowchart of screen data transmitting processing. In the screen data transmitting device 20 shown in FIG. 2, first the screen information generation section 21 generates information of a screen to be displayed according to a drawing instruction (step S1). Next, the transmit image data generation section 22 acquires the display image data generated by the screen information generation section 21, to generate image data to be transmitted to the screen display terminal 10 (step S2). The compression scheme determination section 23 determines which class of GUI component a region which the transmit image data generated by the transmit image generation section 21 occupies in an entire screen belongs to (step S3). The GUI component refers to, for example, a button, a scroll bar, a window title bar, a desktop background, a menu, a text input portion, a list view, etc.

Then, the compression scheme determination section 23 selects a compression scheme that matches the class determined on the basis of the compression properties information stored in compression properties information stored in the compression properties information storage section 24 (step S4). The compression section 25 compresses the image data by using the compression scheme determined by the compression scheme determination section 23 and outputs the compressed transmission data (step S5). The communication section 26 transmits the transmission data from the compression section 26 to the screen display terminal 10 via the network 1.

It is now possible to select a compression scheme according to properties of a display image, and moreover, processing to select the compression scheme can be performed faster, screen image data can be compressed faster and at a higher compression ratio. As a result, image data can be transmitted fast, thereby reducing a time delay from a moment when a screen is transmitted to a moment when it is displayed on the screen display terminal. It is also possible to improve a frequency at which to update the screen at the screen display terminal.

Next, an example of information stored in the compression properties information storage section 24 is described. A table 240 stored in the compression properties information storage section 24 comprises an item that indicates a GUI class, an item that indicates properties of a display image corresponding to a GUI class, and an item that indicates a compression scheme having a highest compression ratio. When the table 240 such as shown in FIG. 4 is stored, it is possible to select, based on this information, a compression scheme that enables a high compression ratio, corresponding to a component to which a transmit region belongs. For example, since a background and a character are both monochromatic in a text region, it is possible to obtain a high compression ratio free of distortion by selecting run length coding. Since a desktop region is a natural picture, such a scheme, for example, JPEG may be selected as to be suitable for compression of a natural image. Information shown in FIG. 4 can be acquired from the OS.

Further, a table 241, shown in FIG. 5, which is stored in the compression properties information storage section 24 comprises an item that indicates a GUI class and an item that indicates an average compression ratio corresponding to the class. This average compression ratio item is divided into an item that indicates a JPEG average compression ratio, an item that indicates a GIF average compression ratio, an item that indicates a run length average compression ratio, etc. A table 242, shown in FIG. 6, which is stored in the compression properties information storage section 24 stores an (average) compression processing time per unit display screen area and comprises items that indicate a compression processing time for the JPEG, GIF, and run length schemes.

If the information of FIGS. 5 and 6 are stored in addition to the table 240 shown in FIG. 4, control can be conducted easily depending on a situation of a network by, for example, selecting a compression scheme with the best compression ratio if the network has a narrow band available and a high compression ratio is demanded or by selecting a compression scheme with a short compression processing time from among those having at least a predetermined compression ratio value if the compression ratio only needs to have the predetermined value and fast processing is demanded. Although the above has described a case where the compression scheme determination section 23 selects a target compression scheme from among those based on the information stored in the compression properties information storage section 24, compression properties such as an image quality and a compression ratio for each compression parameter (e.g., quantization parameter for JPEG) may be stored beforehand in the compression properties information storage section 24 so that the compression scheme determination section 23 can determine the compression parameter as well as the compression scheme based on that information.

Figure 7:
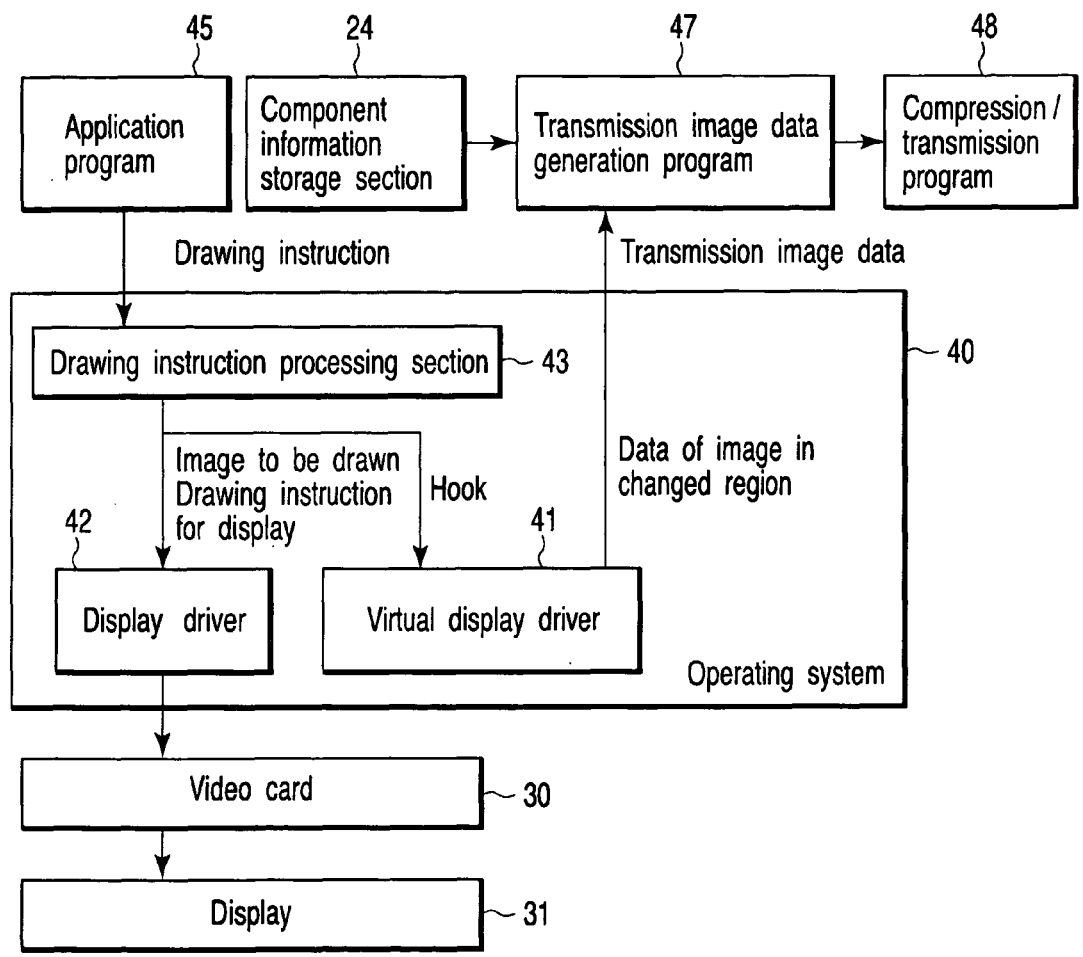
FIG. 7 is an explanatory diagram of a method of an OS of the screen data transmitting device hooking image data which is provided so as to be indicated on a display.
Figure 8:
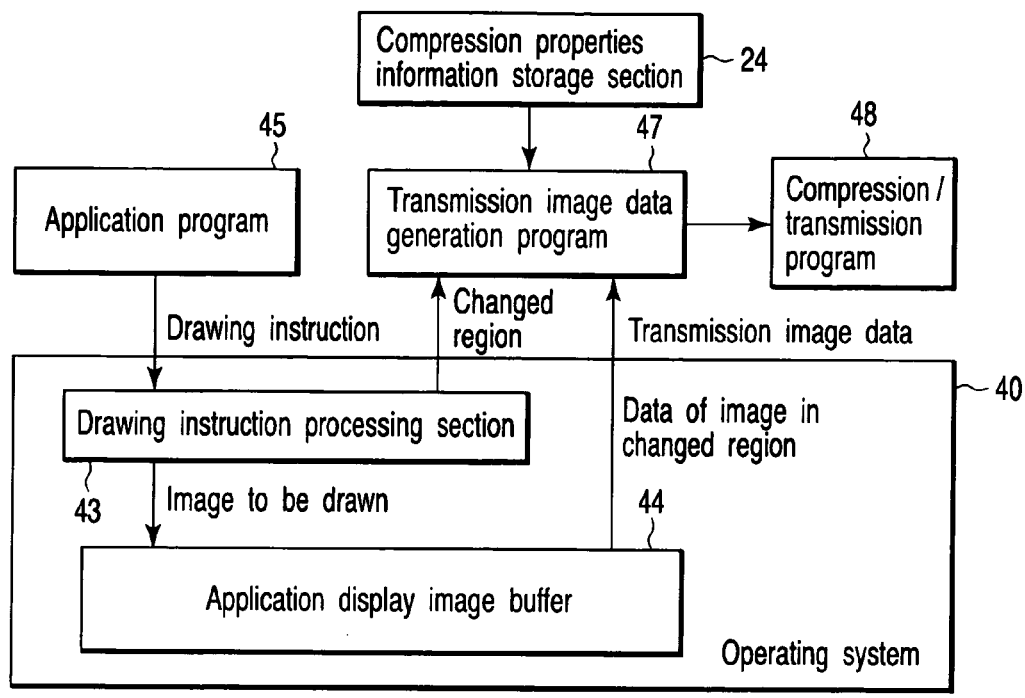
FIG. 8 is an explanatory diagram of a method for acquiring a changed region of a screen from the OS of the screen data transmitting device and separately acquiring image data in this region.
Figure 9:
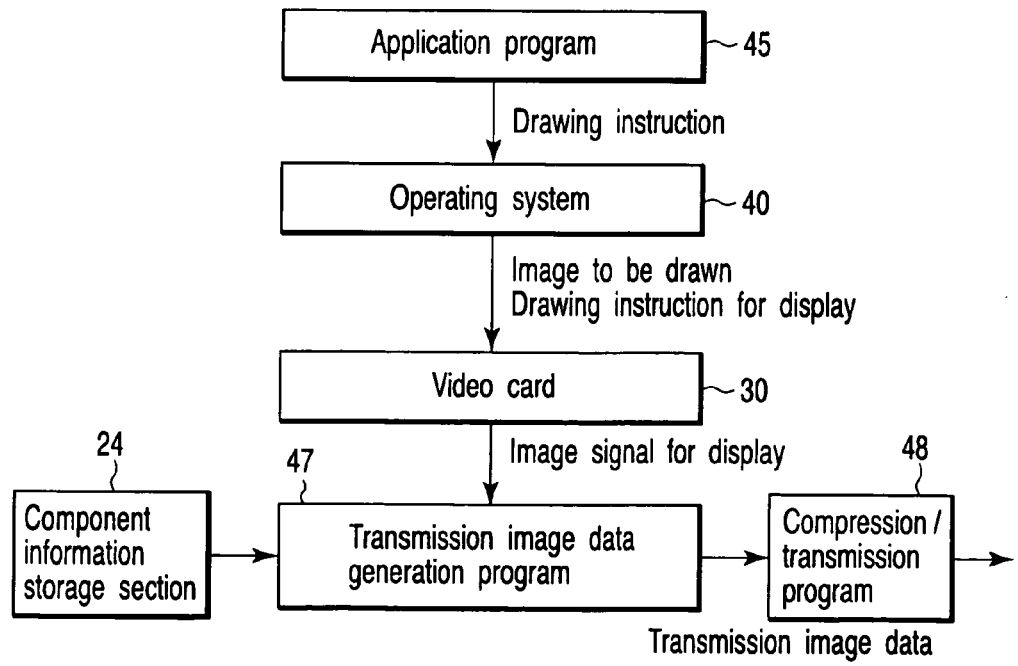
FIG. 9 is an explanatory diagram of a method for generating transmit image data by utilizing a display image signal.

Next, specific examples of a method for generating image data at the screen data transmitting device 20, with reference to FIGS. 7 to 9. FIG. 7 shows a method of an OS 40 of the screen data transmitting device 20 hooking image data which is provided so as to be indicated on a display. First, a drawing instruction is provided from an application in the screen data transmitting device 20 to a drawing instruction processing section 43 in the OS 40. The drawing instruction processing section 43 provides an image to be drawn and a display drawing instruction to a display driver 42. In this case, a virtual display driver 41 in the OS 40 hooks the image to be drawn and the display drawing instruction from the drawing instruction processing section 43.

The display driver 42 generates data of an image to be indicated on the display, according to the image to be drawn and the display drawing instruction. A vide card 30 determines a resolution and a drawing speed based on the supplied image data, to control display on a display 31.

The virtual display driver 41 generates image data of a changed region based on the hooked image to be drawn and the display drawing instruction and provides it to a transmission image data generation program 47. When the transmission image data generation program 47 has acquired the changed region image data and is activated, it acquires component information from the compression properties storage section 24, to compress the transmit image data and provide it to a compression/transmission program 48.

By thus hooking an image to be drawn and a display drawing instruction and compressing and transmitting transmit image data, it is possible to select a compression scheme fast, thereby reducing a time delay from transmission to display of a screen.

FIG. 8 is an explanatory diagram of a method for acquiring a changed region of a screen from the OS of the screen data transmitting device and separately acquiring image data in this region. When supplied with a drawing instruction from the application program 45, the drawing instruction processing section 43 in the OS43 supplies an application display image buffer 44 in the OS40 with the image to be drawn which has been generated on the basis of that drawing instruction. Simultaneously, the drawing instruction processing section 43 provides information of the changed region to the transmission image data generation program 47 based on the drawing instruction if any region has been changed. Further, the application display image buffer 44 provides the changed region image data to the transmit image generation program 47. The transmission image data generation program 47 acquires the component information from the compression properties information storage section 24, to compress the changed region image data. The compressed data is provided to the compression/transmission program 48.

In such a manner, if the image data contains information of a changed region, image data of that changed region can be acquired and compressed, to speed up the compression processing, thereby reducing a time delay from transmission to display of a screen.

FIG. 9 shows a method for generating transmit image data by utilizing a display image signal. First, a drawing instruction is provided to the OS40 from the application program 45 in the screen data transmitting device 20. The OS40 provides an image to be drawn and a display drawing instruction to the video card 30. The vide card 30 generates a display video signal based on the supplied image data and provides it to the transmission image data generation program 47. The transmission image data generation program 47 acquires component information from the compression properties information storage section 24, to generate transmit image data from the display video signal and compress it and provide it to the compression/transmission program 48.

By thus compressing transmit image data by using the display image signal, compression processing can be performed fast, to reduce a time delay from transmission to display of a screen, thereby displaying an image in real time.

Next, a method is described for generating compression properties information about compression properties which are stored in the compression properties information storage section 24. In a case where the transmit image data generation section 22, the compression scheme determination section 23, the compression properties information storage section 24, etc. operates as an application program, the compression properties information can be generated by acquiring classes of GUI components provided by the OS upon installation of the application program, acquiring image data of these components from data of an image on a display screen, attempting to compress the data by using a plurality of compression schemes and parameters, and storing the information in the compression properties information storage section 24.

Further, as for already known image data at the time of when these components are displayed, its compression properties information may be retained in an installer of the application program.

Figure 10:
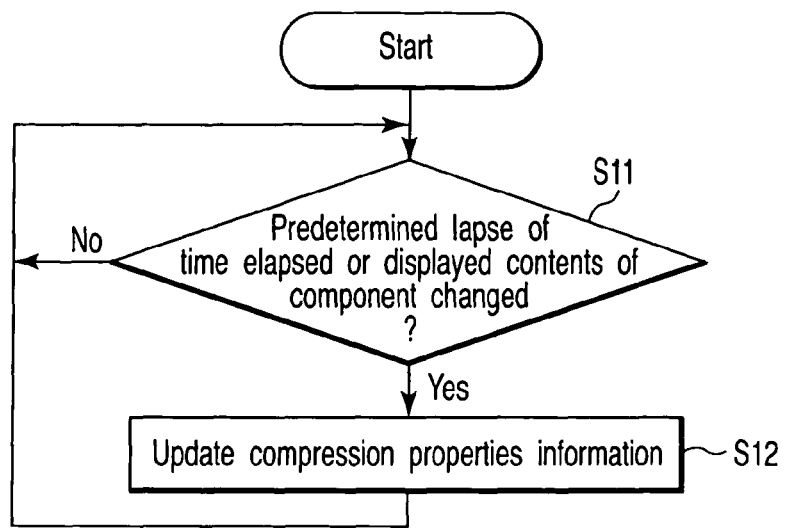
FIG. 10 is a flowchart of processing to store compression properties information when a predetermined lapse of time elapses or if displayed contents of a component are changed.

However, the components are not always displayed one and all at the time of installation and there are multifarious variations in image data of each of these components (for example, image data at the text input portion varies with contents of an input text). Further, if a user changes a display form or design of the component, its compression properties also change. Therefore, to accommodate a lot of components, and at the same time, obtain highly accurate compression properties information, it is desired to acquire image data of these components and perform as many times as possible a procedure for updating the compression properties information by performing a plurality of compression schemes and compression processing by use of a parameter. This procedure is described with reference to FIG. 10. In FIG. 10, first the compression scheme determination section 23 determines, at the time of transmission of a screen, whether a predetermined lapse of time has elapsed of whether displayed contents of any one of the components are changed (step S11). The compression scheme determination section 23 provides compressed information to the compression properties information storage section 24, to update compression properties information (step S12). If the predetermined lapse of time is yet to elapses or the displayed contents of none of the components are changed and the compression properties information is updated, processing of step S11 is performed.

Therefore, it is possible to highly accurate compression properties information by performing this update procedure in every predetermined time interval or by performing this procedure if displayed contents of a component are changed.

Figure 11:
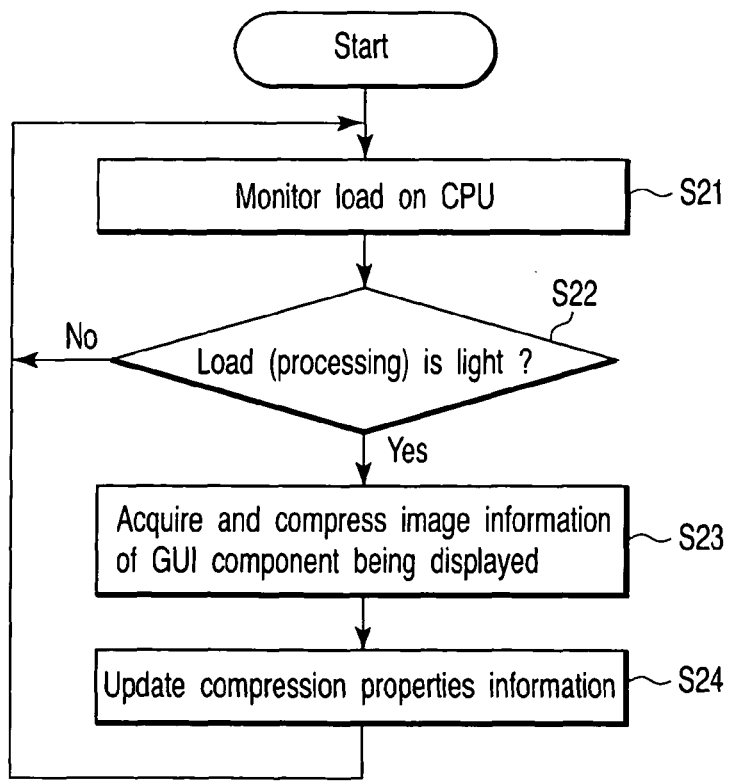
FIG. 11 is a flowchart of processing to store compression properties information during a time when a load on processing is light.

Further, the case of using the load monitor section 27 for monitoring a load on the CPU of the image transmitting set 20 is described with reference to FIG. 11. In FIG. 11, first the load monitor section 27 shown in FIG. 2 monitors a load (processing) on the CPU of the screen data transmitting device 20 when transmitting a screen (step S21). The load monitor section 27 determines whether processing to be performed by the CPU is slight in volume and the load on it is light (step S22). If the load is light, the compression scheme determination section 23 acquires image information of a GUI component being displayed and compresses it (step S23). The compression scheme determination section 23 provides the compressed information to the compression properties information storage section 24, to update the compression properties information (step S24). If the load on the CPU is heavy and the compression properties information is updated, processing of step S21 is performed.

By thus going on with the procedure to update compression properties information if the load on the CPU becomes less than a threshold value, it is possible to implement the procedure to update the compression properties information without preventing compression/transmission processing of the image data.

Figure 12:
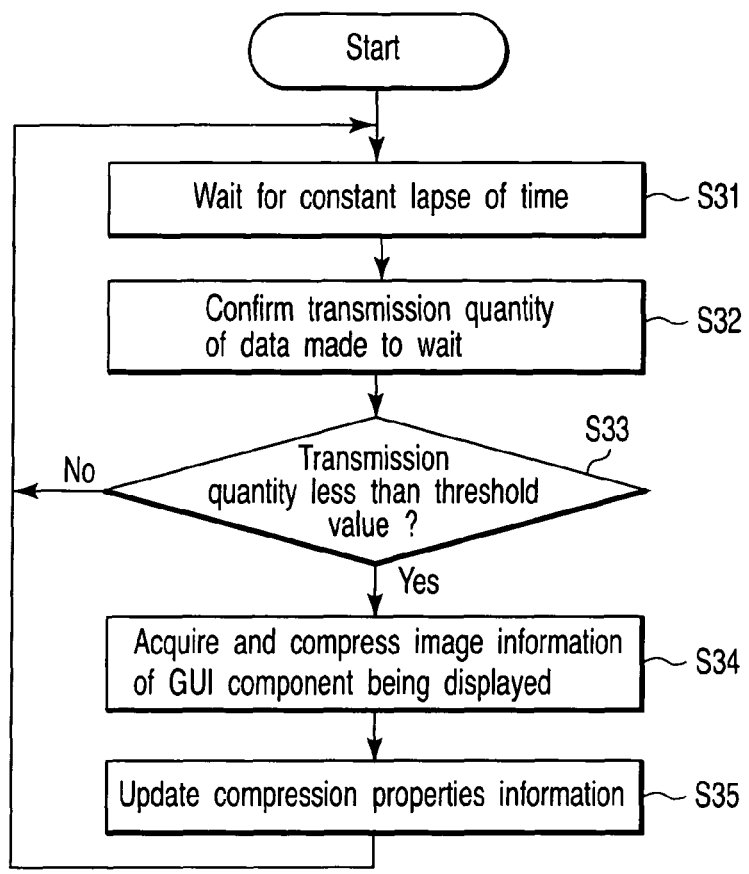
FIG. 12 is a flowchart of processing to store compression properties information when a quantity of transmission data is small.

Further, the case of using the transmission data monitor section 28 in the image transmitting set 20 is described with reference to FIG. 12. In FIG. 12, first the transmission data monitor section 28 shown in FIG. 2 makes transmission of image data from the screen data transmitting device 20 to the screen display device 10 wait for a constant lapse of time (step S31). The transmission data monitor section 28 confirms a transmission quantity of the standby image data (step S32). The transmission data monitor section 28 determines whether the transmission quantity of the image data is not more than a threshold value (step S33). If the transmission quantity of the image data is not more than the threshold value, the compression scheme determination section 23 acquires image information of the GUI component being displayed and compresses it (step S34). The compression scheme determination section 23 provides the compressed information to the compression properties information storage section 24, to update the compression properties information (step S35). If the transmission quantity of the image data is more than the threshold value and the compression properties information is changed, processing of step S31 is performed.

In such a manner, by providing the transmission data monitor means for monitoring transmission data, and if a transmission quantity of a transmit image within a certain lapse of time is not more than a threshold value, deciding that the screen is updated less, to thereby go on with a procedure to update compression properties information, it is possible to implement the procedure to update the compression properties information without preventing compression/transmission processing of the image data.

Figure 13:
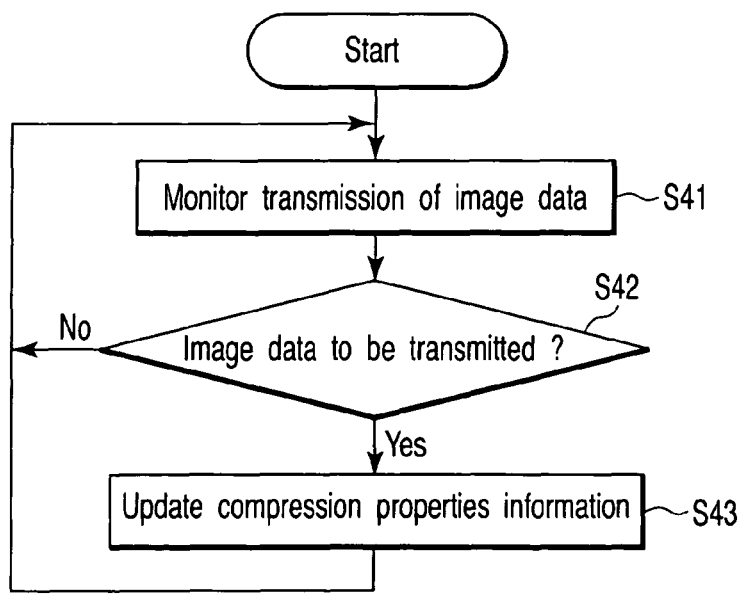
FIG. 13 is a flowchart of processing to store data compressed for transmission as compression properties information.

Further, another example of the case of using the transmission data monitor section 28 in the image transmitting set 20 is described with reference to FIG. 13. In FIG. 13, first the transmission data monitor section 28 shown in FIG. 2 monitors transmission of image data from the screen data transmitting device 20 to the screen display device 10 (step S41). The transmission data monitor section 28 determines whether the transmission data is transmitted already (step S42). The compression scheme determination section 23 provides the transmission image data to the compression properties information storage section 24, to update the compression properties information (step S43). If the image data is yet to be transmitted and the compression properties information is updated, processing of step S41 is performed.

In such a manner, by going on with the procedure to update the compression properties information if image data is transmitted by the transmission data monitor means, it is possible to implement the procedure to update the compression properties information without preventing the compression/transmission processing of the image data.

Figure 14:
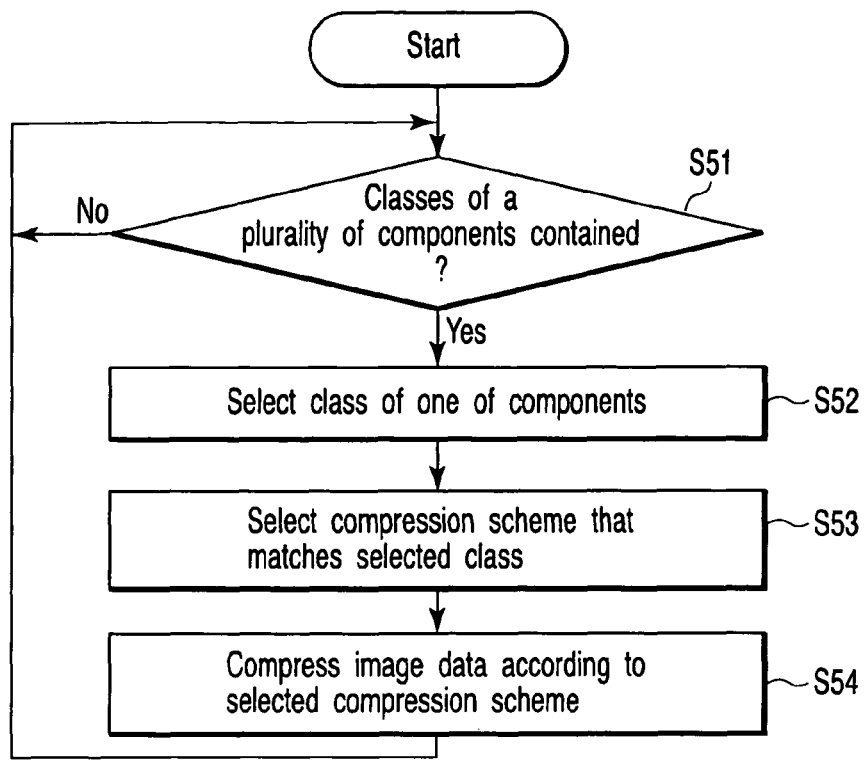
FIG. 14 is a flowchart of processing to compress image data according to a compression scheme that corresponds to one class.

Further, the case of selecting one of classes of a plurality of components, if contained in image data, and compressing it is described with reference to FIG. 14. In FIG. 14, first the compression scheme determination section 23 determines whether classes of a plurality of components are contained in image data to be transmitted (step S51). If such is the case, the compression scheme determination section 23 selects the class of one of the components (step S52). According to the selected class, the compression scheme determination section 23 selects any one of compression schemes stored in the compression properties information storage section 24 (step S53). The compression section 25 compresses the image data according to the selected compression scheme (step S54). If the classes of the plurality of components are not contained and the image data is compressed, processing of step S51 is performed. In such a manner, it is possible to select an appropriate compression scheme according to properties of an image and compress it fast at a high compression ratio.

Figure 15:
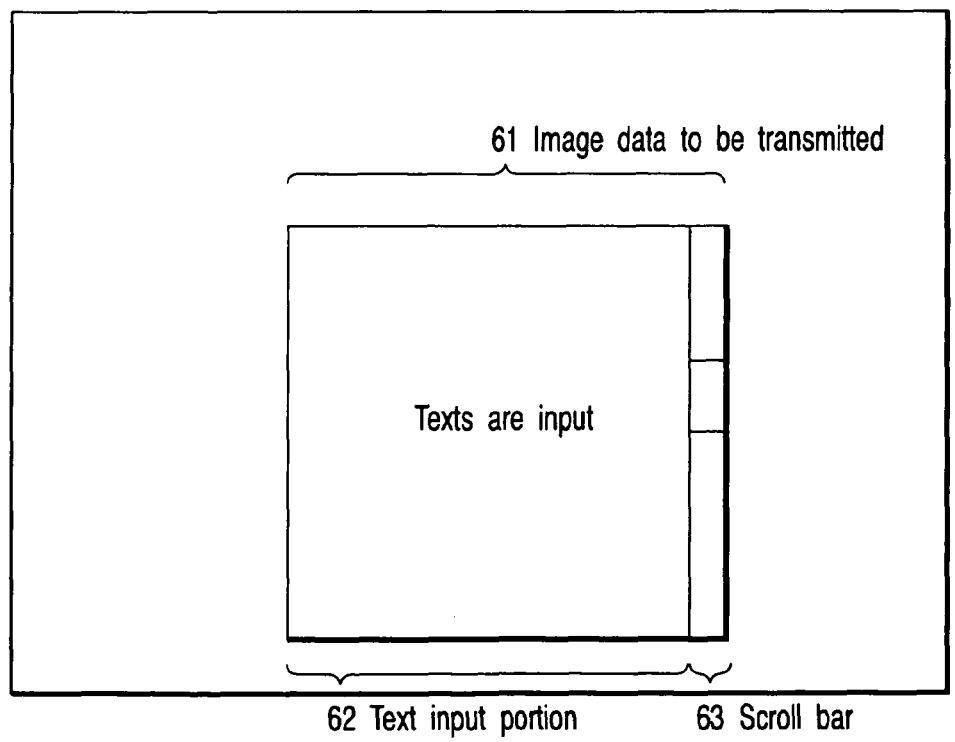
FIG. 15 shows an example where transmit image data is divided.

A region occupied by transmit image data provided to the compression scheme determination section 23 shown in FIG. 2 may cover a plurality of classes of components in some cases. In such a case, the image data is divided in such a manner that transmit image data may be contained in a single class of component. FIG. 15 shows an example of the division. FIG. 15 shows a region 61 of transmit image data covering a scroll bar region 63 and a text input portion 62, in which case this transmit image data is rebuilt into to image data pieces in the scroll bar region 63 and the input portion 62, to select compression schemes suitable for these image data pieces.

However, if the divided image data occupies a too small region, overheads of a header of the compressed data disables realizing a high compression ratio. Therefore, if division results in an occupied region being smaller than a predetermined size, without performing the division, a compression scheme can be selected on the basis of a class of a GUI that occupies the largest region of those for the transmission data pieces, to further increase the compression ratio.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A screen data transmitting apparatus for compressing image data of at least a region of a display image and transmitting compressed image data to a screen display terminal, the region of a display image including at least one of a plurality of classes of graphical user interface (GUI) components, comprising:

a storage device configured to store compression properties information for the classes of the GUI components, the compression properties information indicating at least a compression scheme having a highest compression ratio among compression ratios of suitable compression schemes for each of the classes of the GUI components;

a determination device configured to determine compression properties information for a class of the GUI components of the image data, based on the compression properties information stored in the storage device;

a compression device configured to compress the image data according to the determined compression properties information, thereby generating transmission data; and a transmitting device configured to transmit the transmission data to the screen display terminal, wherein the storage device updates the compression properties information in every constant time interval or if contents of an image that corresponds to the image data are changed, and the storage device stores compression properties information further indicating, for each of the classes of GUI components, a first set of average compression ratios for compression schemes and a second set of average compression processing time per unit for the first set of compression schemes.

2. The apparatus according to claim 1, wherein the determination device includes a device configured to determine a class of the GUI components for the region of a display image.

3. The apparatus according to claim 1, wherein the storage device stores compression properties information further indicating characteristics of an image when each of the classes of the GUI components is displayed.

4. The apparatus according to claim 1, further comprising a load monitor device configured to monitor a load on a CPU included in the screen data transmitting apparatus, wherein the storage device updates the compression properties information according to a result of monitoring by the load monitor device.

5. The apparatus according to claim 1, further comprising a transmission data monitor device configured to monitor a data quantity of the transmission data, wherein the storage device updates the compression properties information according to a result of monitoring by the transmission data monitor device.

6. The apparatus according to claim 1, wherein, if the region includes a plurality of GUI parts, the determination device determines compression properties information for one of the GUI parts that occupies a largest region.

7. The apparatus according to claim 1,
wherein the determination device selects an average compression ratio in the first set and an average compression processing time in the second set, with respect to a network condition including an available bandwidth.

8. A method implemented on a screen data transmitting apparatus for compressing image data of at least a region of a display image and transmitting compressed image data to a screen display terminal, the region of a display image including at least one of a plurality of classes of graphical user interface (GUI) components, the method comprising:
storing, on a storage device of the screen data transmitting apparatus, compression properties information for the classes of the GUI components, the compression properties information indicating at least a compression scheme having a highest compression ratio among compression ratios of suitable compression schemes for each of the classes of the GUI components;
determining, on a determination device of the screen data transmitting apparatus, compression properties information for a class of the GUI components of the image data, based on the compression properties information stored in the storage device;
compressing, on a compression device of the screen data transmitting apparatus, the image data according to the determined compression properties information, thereby generating transmission data; and
transmitting, on a transmitting device of the screen data transmitting apparatus, the transmission data to the screen display terminal,
wherein the storing includes updating the compression properties information in every constant time interval or if contents of an image that corresponds to the image data are changed, and
the storing includes storing compression properties information further indicating, for each of the classes of GUI components, a first set of average compression ratios for compression schemes and a second set of average compression processing time per unit for the first set of compression schemes.

9. The method according to claim 8, wherein the determining includes determining a class of the GUI components for the region of a display image.

10. The method according to claim 8, wherein the storing includes storing compression properties information further indicating characteristics of an image when each of the classes of the GUI components is displayed.

11. The method according to claim 8, further comprising:
monitoring, at a load monitor device of the screen data transmitting apparatus, a load on a CPU included in the screen data transmitting apparatus, wherein the storing includes updating the compression properties information according to a result of monitoring by the load monitor device.

12. The method according to claim 8, further comprising:
monitoring, at a transmission data monitor device of the screen data transmitting apparatus, a data quantity of the transmission data, wherein the storing includes updating the compression properties information according to a result of monitoring by the transmission data monitor device.

13. The method according to claim 8, wherein, if the region includes a plurality of GUI parts, the determining includes determining compression properties information for one of the GUI parts that occupies a largest region.

14. The method according to claim 8,
wherein the determining includes selecting an average compression ratio in the first set and an average compression processing time in the second set, with respect to a network condition including an available bandwidth.

* * * * *